W. S. CRANMER.
FLYING MACHINE OR FLIER.
APPLICATION FILED AUG. 29, 1908.
1,223,940.
Patented Apr. 24, 1917.
5 SHEETS—SHEET 1.
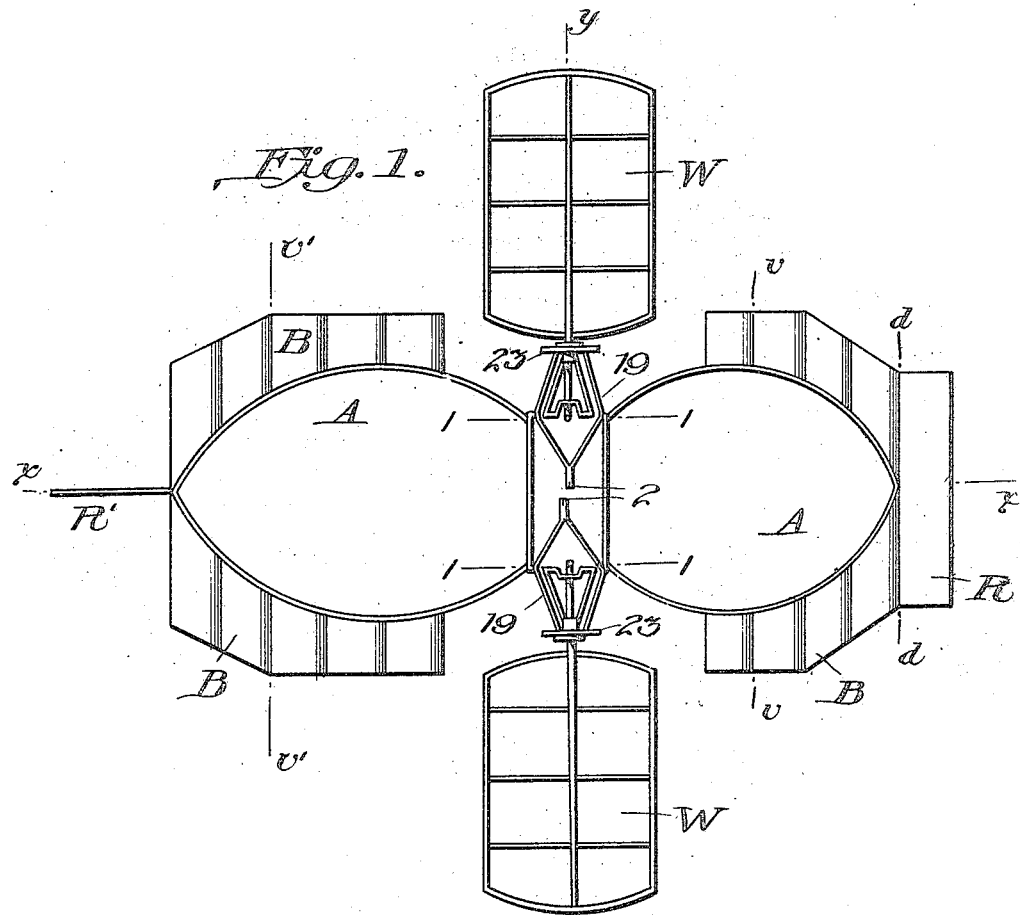
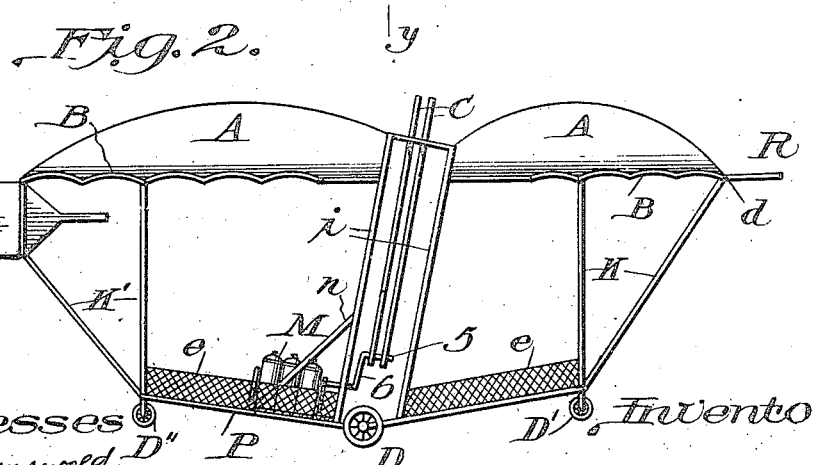

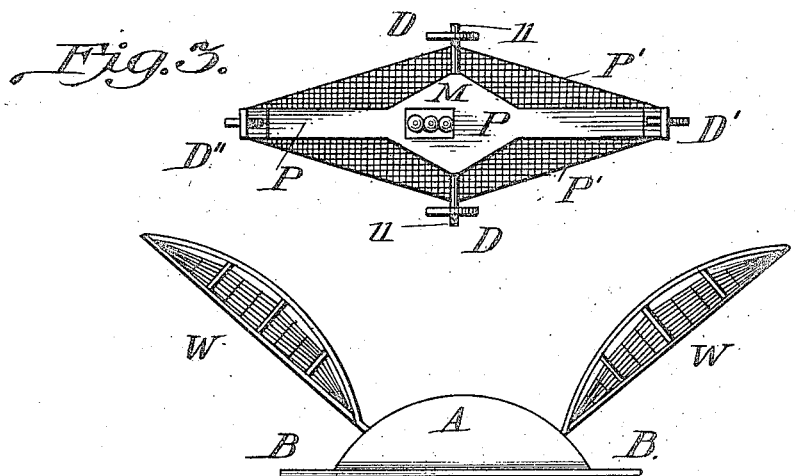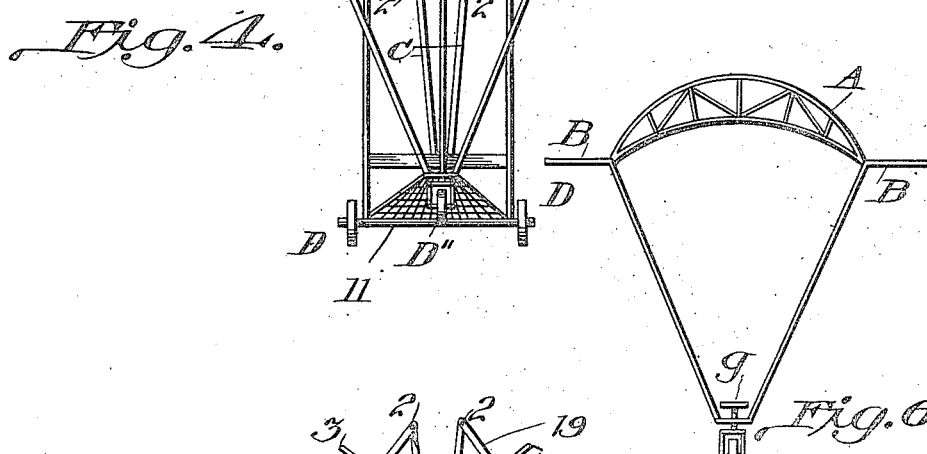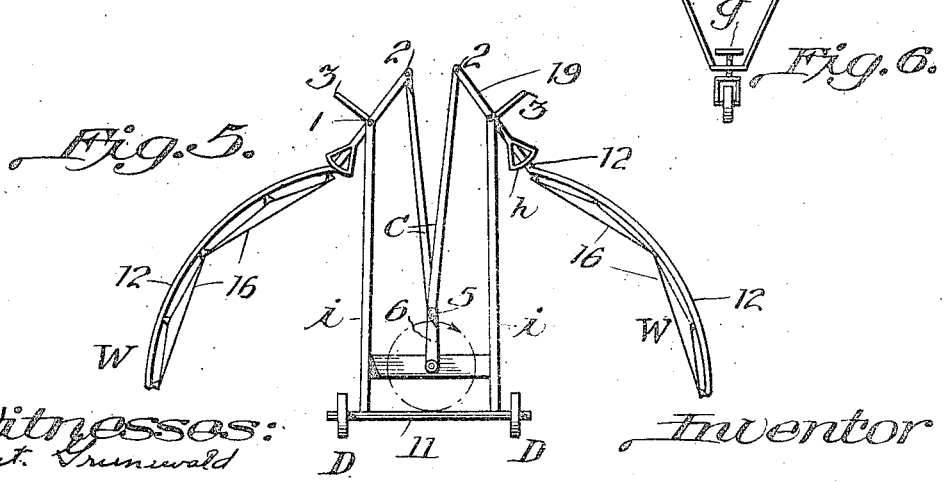

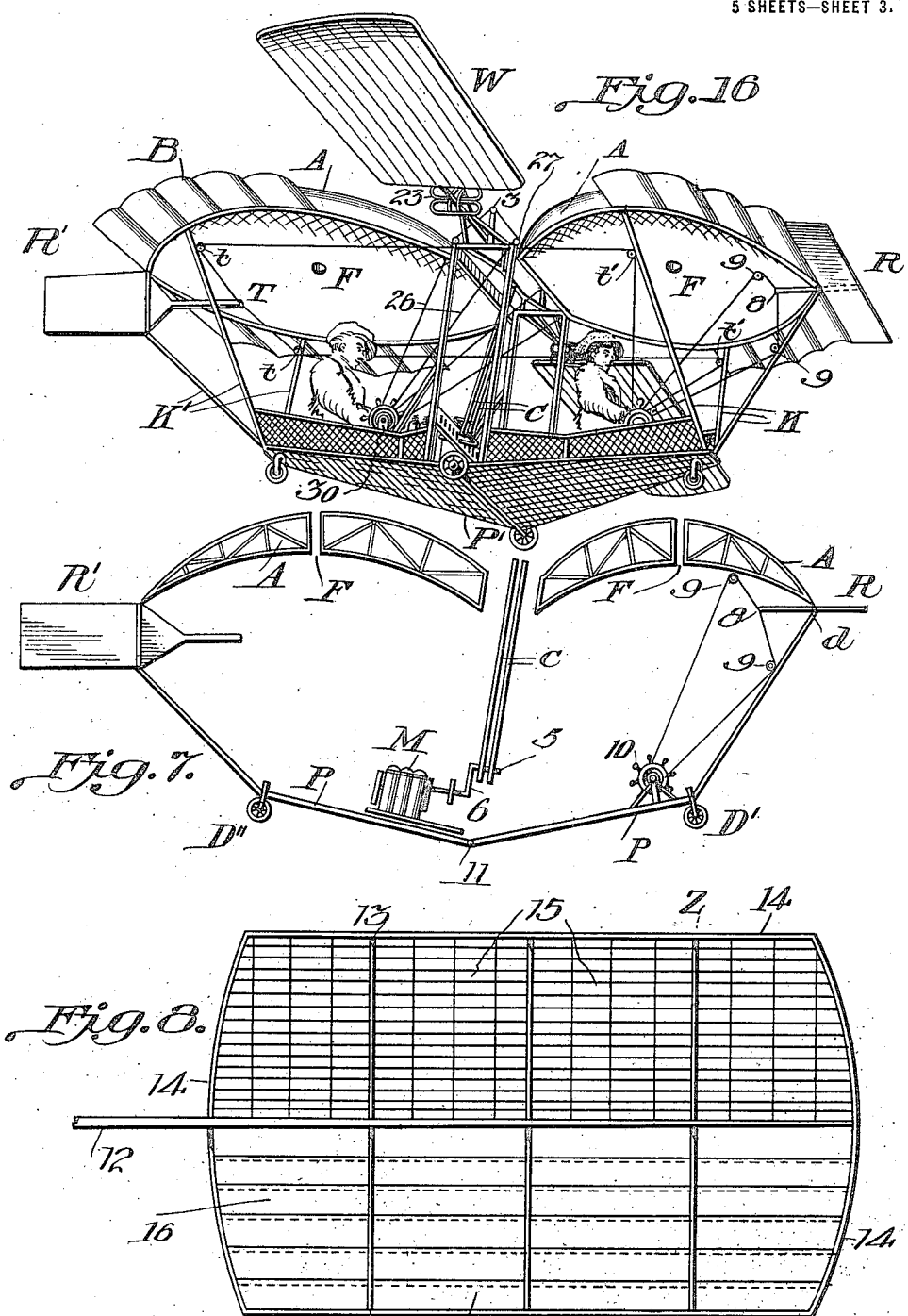

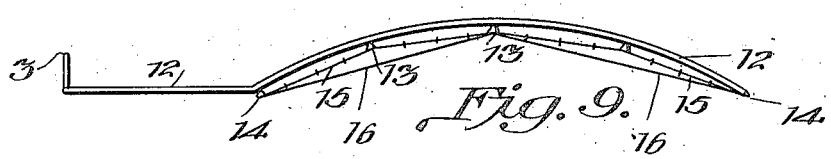
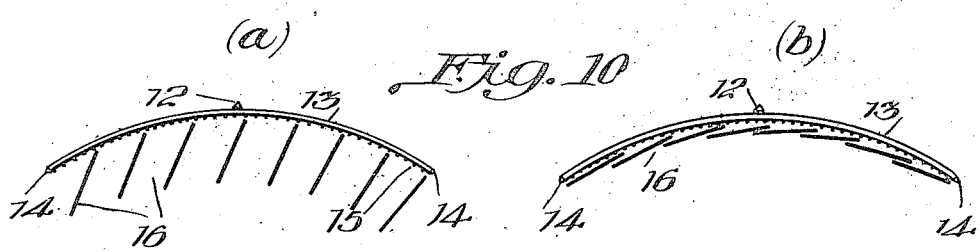
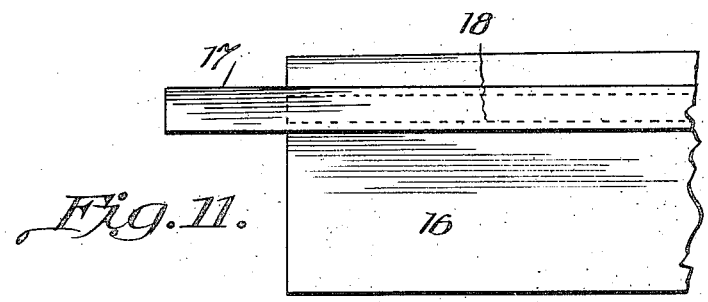
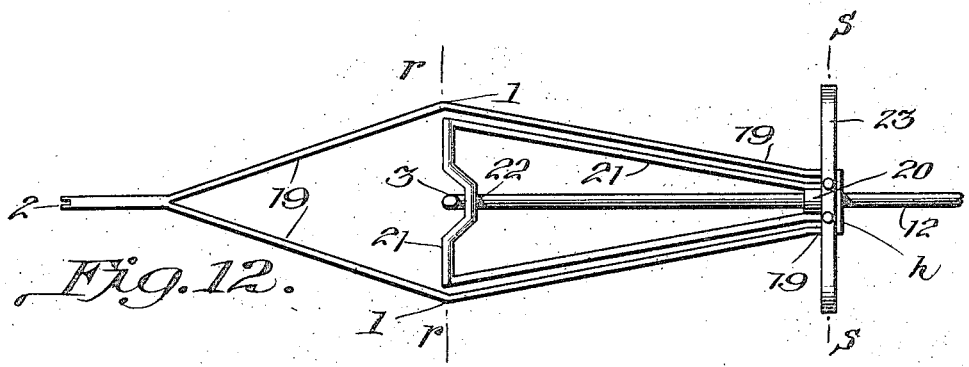

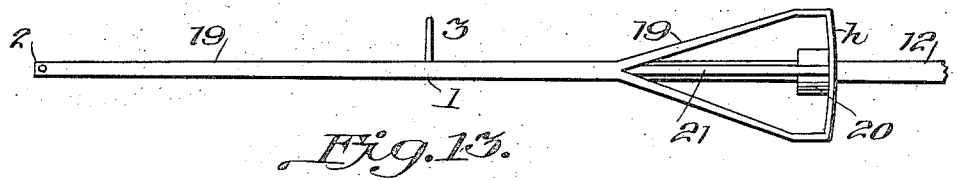
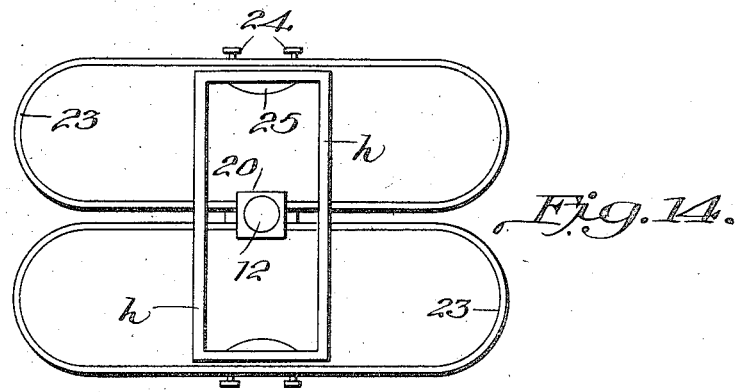
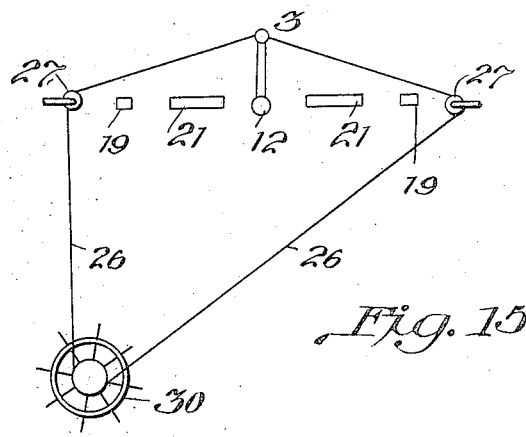

UNITED STATES PATENT OFFICE.

WILLIAM S. CRANMER, OF FRESNO, CALIFORNIA.

FLYING-MACHINE OR FLIER.

1,223,940. Specification of Letters Patent. Patented Apr. 24, 1917.

Application filed August 29, 1908. Serial No. 450,890.

*To all whom it may concern:*

Be it known that I, WILLIAM S. CRANMER, a citizen of the United States, residing in the city of Fresno, county of Fresno, and State of California, have invented a new and useful Flying-Machine or Flier, of which the following is a specification.

My invention relates to improvements in that class commonly known as heavier-than-air flying machines.

The purpose of my invention is to provide a flying machine which will rise directly from the ground without any starting apparatus that will navigate the air safely, that will fall slowly to the ground in case of an accident to the machinery, and that will move about over ordinary roads on land under its own power of steam or motor.

I attain these objects by the mechanism illustrated in the accompanying drawings, in which Figure 1 is a top plan view of the machine. Fig. 2 is a side elevation with the wings omitted. Fig. 3 is a plan view of the platform and lower portion of the machine. Fig. 4 is a rear elevation with the wings at their highest point. Fig. 5 is a vertical section taken through the line $y$—$y$, Fig. 1, with the wings at the lowest point. Fig. 6 is a vertical section through the lines $v$—$v$ and $v'$—$v'$, Fig. 1, illustrating the parachutes and air-chambers from the front or rear. Fig. 7 is a vertical section through the line $x$—$x$, Fig. 1. Fig. 8 is an enlarged top plan view of one of the wings, with the net-work removed in the lower half. Fig. 9 is a vertical section through one wing on the line $y$—$y$, Fig. 1.

Fig. 10 is a vertical section through the line $z$—$z$, Fig. 8, illustrating the two different positions occupied by the valve-strips during the upward and downward strokes of the wings.

Fig. 11 is a detail view showing a portion of a valve-strip, and how it is fastened to the narrow band.

Fig. 12 is a top plan view of the wing driving mechanism.

Fig. 13 is a side elevation of the wing driving mechanism, with the springs at the outer extremity of the wing driving lever omitted.

Fig. 14 is an enlarged vertical sectional view taken on or near the line $s$—$s$, Fig. 12.

Fig. 15 is an enlarged vertical sectional view, on or near the line $r$—$r$, Fig. 12.

Fig. 16 is a perspective view of the flying machine in "soaring" or gliding flight. Similar letters and figures refer to similar parts throughout the several views.

Speaking in general terms, my flying machine, which is intended for carrying two persons, consists of a lower framework or platform, a light superstructure, and two movable planes or wings.

The platform, which is diamond shaped in plan view, (see Fig. 3) is provided with four wheels for movement over land.

The superstructure is rigidly supported above the platform by a rectangular framework which extends upward from the middle part of the platform, ($i$, $i$, Fig. 2) and by three frame pieces which extend upward from the front end of the platform in the shape of an inverted tripod, ($k$, $k$, $k$, Fig. 16) and by three frame pieces, ($k'$, $k'$, $k'$) extending upward from the rear end of the platform in a similar manner, except that the rearmost piece is crooked so as to form a support for the rear rudder.

The superstructure consists of two air-chambers, A, A, forming parachutes beneath, which are arranged tandem, that is, one in front of the other.

Aeroplanes, B, B, extend out from the sides of the air-chambers, near the front and rear.

At the extreme front of the superstructure there is a horizontal rudder R, and at the rear a vertical rudder R'.

The movable planes or wings, W, W, which lift and propel the flying machine, are supported upon the central rectangular framework, and are moved up and down much like a bird's wings.

Having given a general idea of my invention, I will now take up the various parts more in detail, describing the purpose or function, structure, and mode of operation of each part.

To maintain equilibrium, that is to keep the flying machine continuously in upright position, the heavier articles, that is the operators, motor, and principal mechanism connected therewith, are placed on the lower framework or platform near the center of the machine. A large volume is given to the upper parts of the flying machine without materially increasing the weight by air-chambers, A, A, constructed of a light inner framework, (see A, Figs. 6 and 7) covered with some light strong cloth or fabric.

While hydrogen or any other light gas inclosed in the superstructure would accomplish the same result, I prefer to use air, which is itself a light gas, as there are several advantages in using air for this purpose. The supply of air is everywhere plentiful, and there would be no need for inflation; and there would be no danger of explosion, which happens so frequently with airships containing combustible gases. It is not necessary to confine air so closely as hydrogen, and so the air-chambers need not be perfectly air-tight, as the air would enter as fast as it leaked out, thus keeping the air-chambers full of air. Hence there would be no trouble at high altitudes from expansion of the air within the air-chambers as a rarer atmosphere was reached; and a few small leaks, like bullet holes, for example, would not materially affect the usefulness of the air-chambers in maintaining equilibrium.

As a result of the natural law known as the principle of Archimedes, every body immersed in the air is constantly acted upon by two opposite forces. First, gravity, acting downward through the center of gravity, and caused by the attraction of the earth for the body itself. Second, an upward pressure or buoyancy, acting upward through the center of volume, and resulting from the attraction of the earth for the whole body of air, known as the atmosphere, surrounding the earth.

The first force is equal to the weight of the body, and the second force is in proportion to the volume of the body, and is equal to the weight of the quantity of air displaced by the body.

Now the center of gravity in my flying machine, owing to the light bulky superstructure and the heavier lower parts, will be near the lower platform, and the center of volume in or near the superstructure, and hence there will be two opposite forces, one from each of these two points, constantly acting, during flight, to prevent an overturn, and both forces will tend to restore the flying machine to an upright position whenever from any cause it is overturned.

With the double purpose of lessening the amount of resistance these air-chambers will meet with in passing through the air during flight, and also to form circular concave parachutes beneath them (see Fig. 6) the object of which is explained below, the air-chambers are made of the general shape of a thick heavy watch crystal, or an inverted saucer, and placed in a horizontal position with their narrowest dimension to the normal line of flight.

I do not wish to limit my invention to any given thickness of the air-chambers, but claim the right to diminish their thickness to the extent of practically eliminating the air-chambers, leaving the parachutes alone to maintain equilibrium, otherwise expressed as automatic stability, in addition to other functions hereafter more fully described.

Different views of the air-chambers are shown in Figs. 1, 2, 4, 6, 7 and 16, indicated by the letter A. Being nearly circular in shape, convex on the upper and concave on the under surface, they form parachutes which will not only assist in maintaining equilibrium at all times, but which will prevent a rapid and therefore dangerous descent in case of an accident to the machinery, or sudden stopping of the motor during flight.

To prevent a lurching or tipping caused by the accumulation of compressed air in the parachutes while descending, air tubes are provided, one located near the center of each of the parachutes, and extending through the body of the air-chamber to the upper surface thereof, indicated by F, in Figs. 7 and 16.

The open air tube permits the escape of a portion of the air under pressure in the parachute before too great an accumulation of compressed air in escaping from beneath the parachute causes a tipping or lurching from side to side. The opening must be adapted in size to allow the maximum of air pressure under the parachute, without permitting an over accumulation of compressed air, and consequent tipping.

The mouths of the parachutes as well as the openings at the top are kept open and unobstructed for the free entrance of air.

The ordinary collapsible parachute must first fall a considerable distance before being opened out by the air, and in case the ropes at the mouth of it are entangled, it may not open out at all.

Hence the only absolutely safe parachute is one which is always open and ready for instant action. The effect of gravity is so immediate and rapid, that there is no time after an accident happens or a fall commences, to adjust the parachute. Its action must be entirely automatic.

During a fall, the front and rear parachutes, the mouths of which are held steadily downward by the weight of the heavier lower parts, would prevent any violent longitudinal oscillations; and the large and extended spoon-shaped wings would not only act as parachutes in breaking the fall, but together with the side aeroplanes would also tend to prevent any serious lateral oscillations.

The general shape and structure of my flying machine as a whole is such, that if dropped or thrown into the air in any position, it will immediately and automatically assume an upright position, and fall slowly to the ground.

In Figs. 1, 2, 3, 7 and 16 the front of the machine is toward the right, and it is designed that the normal movement shall be in this direction. With the object of diminishing the resistance of the air, the chief parts of the machine are constructed with their narrowest dimensions toward the front, and the intervening spaces are left as open as possible for the free passage of air during flight.

To prevent any tendency to move sidewise during flight, the rear portion of the machine is made larger than the forward portion, that is the propelling means, the wings, are placed somewhat forward of the center.

The rectangular framework near the center of the flier which extends from the platform to the superstructure, and supports the wings ($i, i$, Fig. 2) is constructed so as to lean to the front; that is, the angle made with the general line of the superstructure at the front side of the framework is somewhat obtuse; the object being to keep the axis of the wings horizontal during flight, when the rear portion of the superstructure will be somewhat depressed below the horizontal.

The side aeroplanes, shown in Figs. 1, 2, 4 and 16, indicated by B, are attached to the main framework of the superstructure, are built in sections, and may be slightly curved on the under side. The purpose of the side aeroplanes, which may be constructed of a light framework of slats, covered with cloth, is to assist in sustaining the weight of the flier during flight, and also to give steadiness by preventing any lateral rocking movement. The size and shape best adapted for these purposes can only be determined by practical flight.

To steer the machine upward or downward, a horizontal rudder is placed at the front, indicated by R, (Fig. 1). It has a pivotal axis $d, d$, and a reference to Fig. 7 will show how it may be controlled by a rope attached to a backwardly extending arm at 8, and the ends of the rope passed through pulleys 9, 9, one secured above and the other below the point of attachment, and thence running to the drum of a steering wheel on the lower platform, as shown at 10.

The rear rudder R′ is used for steering to the right or left. Two ropes are attached to the forwardly extending arm of the rear rudder at T, (Fig. 16) and these ropes run separately and oppositely through pulleys $t, t$, secured to the two side frame pieces extending from the rear end of the lower platform to the superstructure, and said ropes thence run through pulleys $t', t'$, to a steering mechanism within reach of the forward operator.

A network of strong cords is stretched over the lower framework or platform, P′, (Figs. 3 and 16) and a narrow walk, P, P, resting upon the network of cords extends from the front to the rear of the platform. This narrow walk may be constructed of canvas as a base to give the necessary strength, and with a top flooring of compressed paper to give the necessary stiffness, cemented to the canvas. It should be secured to the framework near the front and rear ends of the platform, to the central rectangular framework, and to each of the network of cords passing under the walk.

The narrow walk is the deck for the accommodation of the operators, and enables either of them to move forward or backward along the platform, during flight, for the purpose of steering upward or downward by shifting the weight and tilting the front of the flying machine upward or downward.

The narrow walk and the network of cords under it would act as an elastic net to protect the operators from shock, in case the flier struck the ground with force, in landing from flight.

For the safety of the operators, the narrow walk is provided with a hand rope or railing at each side ($e, e$, Fig. 2) from which a network of cords is stretched down to the platform.

The axle shaft of the two driving wheels D, D, indicated by 11, which extends across the middle of the diamond shaped platform shown in Fig. 3, on the line of the shorter diagonal of the diamond, is detachably geared to the motor, M, in a manner similar to like parts in an automobile, for the movement of the machine from place to place over land, or when starting to fly to take a short run on the ground to get the sustaining force of the superstructure into action, and thus assist the wings in rising from the ground.

The end wheels D′ and D″ are each placed on a vertical axis, and each is controlled during movement over land by means of upper cross-bars, ($g$, Fig. 6) to which ropes are attached and run to a suitable steering device within reach of the operator. By connecting the opposite ends of the cross bars of the front and rear wheels, a pull upon the rope will produce an opposite effect on the position of the front and rear wheels, but this will give the same steering effect. An inspection of Fig. 2 will show that only one of these wheels can touch the ground at any time. But no matter which is upon the ground, the same steering effect will be produced.

An important object of all four of the wheels is to prevent injury to the flier when landing from flight. The arrangement of four wheels placed at the corners of a diamond shaped platform, composed of two planes which form an obtuse angle with each other on the line of the shorter diagonal of the diamond, thus giving the front and rear wheels a raised position, as shown in Fig. 2, gives a broad foundation to the flyer which is needed to protect the more fragile upper parts from injury in landing. No matter what part of the platform may strike the ground first, one or more of the wheels will be in position to guide the flier forward until the momentum is spent.

The power to operate the wings is derived from the motor M, (Fig. 2) which is detachably geared in any suitable manner to the driving crank 6 (Figs. 2, 5 and 7).

The motor is supported on a small rigid platform built out from the rear side of the central rectangular framework, and strengthened by oblique side braces $n$, (Fig. 2), extending from the outer corners of the small motor platform upward to the said framework. The crank-pin 5, has journaled upon it two upright bars, C, C. The turning of the crank causes the upper ends of these bars to move up and down, and these ends being pivotally connected at 2, 2, (Fig. 5) with the ends of the driving levers 19, 19, a similar up and down movement is given to the ends of the driving levers, which are pivoted in the central rectangular framework at 1, 1.

The inner part or stem of the main shaft of the wing, 12, (shown as a whole in Fig. 9) is secured in the triangular frame 21 (Fig. 12) at the two points 20 and 22, and the inner side of this frame is also pivoted on the line 1, 1. (See Fig. 1.)

The outer end of this frame, inclosing the stem of the wing shaft, is connected with the outer end of the driving lever 19, by means of a combination of curved springs 23, 23, (Fig. 12) located within the collar $h$, and shown in detail in Fig. 14.

These springs are attached at their middle parts to the collar $h$ of the wing-driving lever 19, as shown at 24, 24, (Fig. 14) and the ends of the springs are secured to the box 20, inclosing the stem of the wing shaft 12. Two rubber cushions 25, 25, prevent the box 20 from striking the collar $h$ as the wing shaft vibrates up and down.

The movement of the driving levers is thus communicated to the wings, through and by means of the springs, and the two wings are moved rapidly up and down in unison.

Without elasticity, no wing structure however strong could long stand the strain of moving rapidly and suddenly stopping at the end of each stroke. To overcome this difficulty, elasticity is given to the wing movement by the above described combination of springs, which forms an elastic connection between the outer end of the driving lever and the stem of the wing blade.

This combination of springs prevents a jar by acting as a cushion during a reversal of the wing, and it saves power by storing up in the springs the power required to stop the wing at the end of a stroke in one direction, and returning that power in the form of motion to the wing as it moves off in the opposite direction.

The shock and loss of power is thus avoided, and this form of mechanism, common to all winged creatures, approaches the smoothness and perfection of circular motion.

An enlarged plan of the body of one of the wings is shown in Fig. 8. All the parts of the main shaft or principal frame piece of the wing are shown in Fig. 9, indicated by 12. The outer portion of the main shaft, or that part in the body of the wing is curved. The inner part, or stem, is straight except at the inner end which is bent at a right angle, forming a shank or elbow, indicated by 3, the purpose of which will be explained later on. The stem is made of considerable length in order to give the inner portion of the wing blade sufficient movement to render that part of the wing blade effective.

Secured to the under side of the curved portion of the wing shaft are cross bars 13, 13, which are also curved. (See Fig. 10.) The rim of the ring, 14, 14, is rectangular except that the two end pieces are somewhat curved outwardly, the side and end pieces are compactly joined or continuous at the corners, and all parts of the rim are in the same plane. The rim is secured to the under side of the main shaft, and to the ends of the curved cross bars, and forms a ring-like base compactly binding the whole framework.

All the frame pieces are triangular in cross section, with the apex of an angle upward, and a flat side downward, the object being to lessen the resistance of the air during the upward stroke of the wing, and to increase it during the downward stroke.

To the under side of the curved cross bars and rim of the body of the wing are secured cords or wires stretched in two or more directions, and forming an interlacing network, 15, 15, (Figs. 8 and 9). Beneath the interlacing network of cords or wires, and resting against it when closed, are the valve-strips. They are strips of silk or some light material, sewed or otherwise attached at one side to narrow bands of linen or other strong material. The method of attaching a valve-strip to the narrow supporting band is shown in Fig. 11, in which 16 is a portion of a valve-strip, 17 is the end of the narrow band, which is secured to the rim of the wing, and at 18 is shown how the narrow band is sewed or secured to the valve strip, at one side thereof, in two lines.

In Fig. 8, the network of wires or cords is removed in the lower half of the wing, to show the valve-strips, 16, 16, extending lengthwise, and overlapping as indicated by the dotted lines. They are secured to the wing by means of the narrow bands, at the ends to the rim, and at the middle to a curved cross bar. (See Figs. 5 and 9.)

The wings are so constructed as to permit the air to pass freely through the body of the wing on the upward stroke, and to prevent its passage on the downward stroke. The difference in the resistance met with on the upward and downward strokes is the source of the lifting power of the wings.

The automatic opening and closing of the valve-strips is illustrated in Fig. 10 (a), which shows the valve-strips open on the upward stroke of the wing, and in Fig. 10 (b), which shows them closed on the downward stroke and slightly overlapping. In Fig. 10, the movement of the wings is supposed to be forward toward the right, and the valve-strips to be fastened on their forward side.

The air resistance encountered during the upward movement of the wing, would cause the valve-strips to hang straight down, but the elasticity of the narrow bands to which the valve-strips are secured, forces the valve-strips backward, and they assume an oblique position downward and backward as shown in Fig. 10 (a). As the wing moves upward, the valve-strips strike the air obliquely with their upper sides, and propel the flier forward.

The manner of fastening the valve-strips to the wing by means of the narrow bands in three or more places, (in Fig. 9, the valve-strip is fastened to the wing in only three places,) allows the greater portion of each valve-strip to swing out from the body of the wing slightly during the upward stroke of the wing, and turn edgewise, that is turn its sharp forward cleaving edge in the same direction the wing is moving, thus encountering but a small amount of resistance in passing through the air. Immediately on commencement of the downward stroke of the wing, the torsional elasticity of the narrow bands to which the valve strips are attached, and the air resistance encountered, cause the valve-strips to fall back in place against the interlacing network, in the position shown in Fig. 10 (b).

The supporting bands act as springs, holding the valve-strips in a closed position during the downward stroke, and in an oblique position during the upward stroke of the wings.

The valve-strips are placed lengthwise of the wings, but at right angles to the line of flight, and secured at or near their forward part, that is somewhere between the middle of the valve-strip and its forward edge.

There should be some elasticity and a considerable degree of stiffness in the valve-strips, and a greater degree of elasticity in the narrow bands, which may be made of steel.

Each downward stroke of the concave wings, which act like parachutes, lifts the flying machine, and each upward stroke drives it forward. Both downward and upward strokes are effective, and the flying machine is sustained in the air and propelled forward by successive impulses, rapidly repeated.

I will now explain a method of steering by means of the wings, designed to be under the control of the operator stationed on the rear part of the platform.

The wing shaft is journaled with ball-bearings at the two points 20 and 22 in the frame 21, Fig. 12, and the frame is pivotally mounted on an axis in line with 1, 1, the shank or elbow heretofore mentioned taking the position shown at 3, directly in line with the same axis 1, 1.

In Fig. 13 the position of the shank or elbow is shown in a side elevation, and in Fig. 15 in a vertical sectional view, where ropes 26, 26, are attached to the upper end at 3 and run through pulleys 27, 27, also placed directly in line with the axis 1, 1, (Fig. 12), and thence through other pulleys below to a steering wheel 30, within reach of the operator.

The wheel 30 as represented in Fig. 15 is not in the vertical plane which passes through the axial line r—r (as shown in Fig. 12), and to that extent Fig. 15 is not a true sectional view.

The steering mechanism of which the wheel 30 forms a part, is located on the rear part of the platform. It is constructed of two drums placed end to end and revoluble on a common axle shaft extending transversely of the flier and similarly situated with reference to each of the wings. Radial arms or spokes, forming wheels, extend outwardly from each of the drums at the ends which are adjacent, and each duplicate part is constructed as represented in the sectional view shown at 30 in Fig. 15.

The ropes connecting each drum of the steering mechanism to the adjacent wing are passed once around the drum, drawn taut, and secured at one point to the drum. A general perspective view is shown in Fig. 16.

Referring to Fig. 15 for explanation of the details of operation of one wing, a turn of the top of the wheel 30 toward the right or front will cause the end 3 of the shank of the wing shaft to move toward the right or front, the wing shaft being revolubly mounted in the frame 21, and the wing shaft 12, forming the main center frame piece of the blade of the wing, being turned, will depress the forward part of the wing blade and elevate the hinder part, and the wing blade will strike the air obliquely and thus increase the forward propelling action of the wing.

An opposite movement of the wheel 30 to the left or rear will cause an opposite position of the wing blade, and a tendency to stop the flier or to propel it to the rear.

The wheel 30 can be moved either when the wing is at rest or in motion, because the vibration of the wing does not alter the distance between the end of the shank 3 and the pulleys 27, placed exactly on the axial line, as the point 3 moves back and forth in the arc of a circle which is perpendicular to the axial line, and the distance between 3 and 27 is constant during vibrations of the wing unless the position of 3 is altered by turning the wheel 30.

If the similarly situated projecting spokes of the two adjacent wheels of the steering mechanism be clasped by the hand of the operator or by any convenient means, so that the two wheels and the two drums will turn in unison, the extended clasped spokes of the two wheels thus act as a means for turning the blades of the two wings simultaneously forward or backward in unison, for the purpose of increasing the forward propelling action, or retarding the motion of the flier.

But by unclasping the adjacent spokes projecting from the two wheels of the steering mechanism, and the operator, by means of the spokes, turning one of these wheels forward and the other backward, one wing may be made to propel the flier forward, and the other wing to retard or propel backward, with the result that the flier will turn quickly toward that side on which the wing is propelling backward.

When "soaring" or gliding with the wings at rest, the flier may be steered downward or upward by turning the wings simultaneously forward or backward as already explained; or if the wings are turned separately, the flier could be righted or brought to a level position when sagging on one side by turning the wing blade on that side partly backward, causing that side to rise.

There are two natural forces to be overcome in flying, the resistance of the air to forward movement, and the downward force of gravity; and these two forces, generally speaking, act at right angles to each other.

Therefore to accomplish flight, there must be opposed to these natural forces two other forces of greater power, a sustaining force and a propelling force, which also act at right angles to each other.

The wings of my flying machine constitute a device well adapted to safely accomplish flight, since the operation of the one device generates the two required forces, a sustaining force and a propelling force acting at right angles to each other.

The lack of safety connected with the use of the modern aeroplane is partly owing to the fact that in the aeroplane the required sustaining and propelling forces acting at right angles are generated by two separate devices, the curved plane and revolving propeller; and this doubles the chances of failure and disaster, since each of these devices may be in some respects defective, and each is liable to the chance of failure at any time.

The chances of disaster in the use of the aeroplane are further multiplied by the fact that the successful operation of the sustaining device is wholly dependent on two diverse conditions. The aeroplane must be kept in a substantially horizontal position, and it must be kept moving rapidly forward. Whenever from any cause the aeroplane either loses the required horizontal position or ceases to move forward, the sustaining force entirely fails, and an immediate fall is certain.

When driven by a powerful engine at an excessive and dangerous speed, the revolving propeller generates a moderate propelling force if it is kept moving forward into new air, but when stationary it quickly creates a rearward current of air, which greatly reduces its propelling force.

Neither the sustaining nor the propelling function in my flying machine is dependent on forward movement, and this will enable it to rise directly upward from the ground like a sparrow, without any preliminary run along the ground.

It can also be made to fly slowly, or to poise in the air.

Poising in calm air may be effected by inclining the flier backward to such an angle that the resultant of the sustaining and the propelling forces of the wings will be a force acting vertically upward, and exactly equal to the weight of the flier. Poising in a high wind may be accomplished by flying against the wind at a speed equal to the wind's velocity.

The sustaining power of my flier may be increased at any time by increasing the velocity of wing movement, since each wing stroke performs a certain amount of lifting. But the propelling power will not increase materially when the wings are moved faster than the normal velocity, but will remain nearly constant, since the propelling power is measured by the elastic strength of the band springs, or elastic bands, which hold the valve-strips out obliquely during the upward stroke; and these springs will propel at their full strength just one-half the time, whether the wings move fast or slow.

This automatic action of the wing springs in maintaining nearly constant the propelling power of the wings, will be very useful in rising in the air when a large lifting force is required. For while the propelling force remains nearly constant and normal, the lifting or sustaining force can be very greatly increased by increasing the rapidity of wing movement, and nearly the whole of the reserve motive power can be exerted for a short time in lifting the flyer from the ground into the air.

Wings best adapted for long level flights, will not be well adapted for rising quickly in the air. I will explain why.

The propelling power of the wings may be increased by giving greater strength to the band springs, and more stiffness to the valve-strips. This will cause the valve-strips to be held out more strongly and at a greater angle during the upward stroke, partly closing the wings, and adding to the air resistance encountered.

But increasing the air resistance on the upward stroke will reduce the lifting power of the wings, because the lifting power is equal to the difference between the air resistance on the up and down strokes, the resistance on the down stroke being the greater, as the wings are then entirely closed.

Consequently a flier in which the propelling function is well developed will not be able to rise quickly in the air, because the lifting or sustaining power of the wings will necessarily be much reduced.

The wings of a flier specially adapted for rising quickly in the air should be constructed so as to cause the greatest possible difference between the air resistance on the up and down strokes. This can be done by making the wings broad and deeply concave, the band springs weak, and the valve-strips flexible.

Just the opposite construction should be adopted for the wings of a flier specially adapted for long level flights; that is, the wings should be long and narrow, only slightly concave, and provided with strong band springs, and stiff valve-strips.

The two different methods of steering already described, one under the control of each of the two operators, will give greater safety than a single method. For if one should fail at a critical moment, the other will nearly always be available to prevent disaster.

Safety will likewise be promoted by the two devices for maintaining automatic stability, the air-chambers and the parachutes, each of which is dependent on a different natural principle; and also by the two separate devices for preventing the bad effects of an accidental fall to the earth, the parachutes and the elastic net stretched over the platform.

The curved under surface of the side aeroplanes, parachutes, and wings of my flying machine will make it a good glider, and there will be two ways of coming down safely from a high altitude with the motor shut off, either to come straight down by making use of the parachutes, or to glide down obliquely.

In the construction of my flying machine, I have adopted the essential principles of flight as shown by a careful study of the structure and flight of birds, without attempting to exactly imitate that very perfect natural flying machine, the bird, which is so well adapted to meet the conditions of actual flight.

In order to more fully explain the structure, operation, and functions of those parts of my flying machine making use of the principles which I have derived from a study of bird flight, I will now call attention to some features of the structure and flight of birds, and also to some features of flying insects in which the same principles of flight are applied.

Imitation of the soaring flight of birds led to the discovery of the gliding or sustaining principle of the modern aeroplane. But only a few birds soar, and all birds flap their wings when rising in the air.

During the horizontal flight of a large bird, such as a hawk, observation from a point at one side of the flying bird shows that the wings are moved vertically up and down, and that the blade of each wing, speaking with reference to its extent from front to rear, is at all times parallel to the line of flight.

An examination of a bird's wing, as for example the wing of a chicken, will show that the feathers are light, strong, and very elastic; that the under side of the wing when spread out in the proper position for flight is concave or spoon-shaped; and that in this position, each feather overlaps the one next in front of it, and the outer portion of the wing consists of stiff feathers extending straight out, or substantially transverse to the line of flight.

These outer wing feathers, usually called the primary feathers, each consist of a stiff tube-like quill supporting a blade having a sharp narrow fringe on the front side, and a wide fringe on the rear side. That is, the supporting quill is not in the middle, but at the forward side of the feather blade.

The outer wing feathers are the most effective part of the wing during flight, because they move much farther and faster than the inner parts, being farthest from the axis of motion, the shoulder of the bird.

My theory of bird flight, already indicated in describing the operation of the wings of my flying machine, is as follows:

The effect of the downward movement of the concave wings, which act like parachutes, is to lift and sustain the bird in the air; and the effect of the upward movement of the wings, during which the primary feathers of each wing act precisely like a series of revolving propeller blades except that they do not make a complete revolution but less than half a revolution, is to propel the bird forward;—the two forces thus generated acting at right angles to each other.

On commencement of the upward stroke of the wing, the wide rear side of each primary feather is pressed downward by air-resistance, allowing air to pass freely through the wing, the quill partly turning so as to bring the sharp and narrow forward side of each primary feather in position to cleave the air obliquely upward and forward with small air resistance. The elasticity of the supporting quill holds the wide rear side of each primary feather in oblique position downward and backward, during the upward movement of the wing, and each feather blade glides through the air in the position of an inclined plane, striking the air a glancing blow, and propelling the bird forward.

Only the rapidly moving outer or primary feathers extending nearly transverse to the line of flight are in position or have sufficient speed to propel forward. The wing feathers near the body of the bird which extend toward the rear act chiefly as aeroplanes, as they do not have very much motion.

The bird simply moves its wings up and down, and the opening and closing of the wing feathers, which act like valves, is entirely automatic, being caused by air resistance.

The resultant of the three forces acting simultaneously on the bird during flight, consisting of gravity, the lifting force of the wings, and the propelling force of the wings, determines the direction of movement of the bird.

During horizontal flight, the force of gravity is exactly overcome by the lifting force of the wings, and the forward propelling force becomes the resultant of the three forces.

In the act of poising in calm air, as I have observed practised by small hawks and humming birds, the body and wings of the bird are inclined backward at an angle of about 45 degrees. In this position, the resultant of the lifting and the propelling forces of the wings, acting at right angles to each other, is a force acting vertically upward which is exactly equal to the force of gravity, or weight, acting downward. The resultant of the three forces is equal to zero, and there is no movement in any direction.

The correctness of my theory of bird flight is indicated by the fact that it affords a reasonable explanation of the peculiar manner in which birds poise, or remain stationary in the air, while flapping their wings, something hitherto unexplainable.

One of the most noticeable things about bird flight is the flapping sound which is heard when near any large bird during flight, as the domestic chicken, turkey or pigeon. The same flapping sound is heard without actual flight, when a cock flaps his wings previous to crowing.

Observation shows that the wings do not strike each other, nor the body of the cock, and that the flapping sound is made when the wings are near their highest point.

The sound is evidently produced by the drooping wider side of each feather blade striking against the stiff quill of the next adjacent feather, when suddenly closed by air resistance at the commencement of the downward stroke.

The purpose of the cock is to make a noise, and the flapping of the wings previous to crowing is louder and less frequent than during ordinary flight. When flapped previous to crowing, the wings are moved very rapidly in the upper part of their course, snapping the feather valves shut much in the same way that a whip is snapped, while in the lower course the wings are moved more slowly.

The rapid flapping sound produced by the wings of a small bird is called "flutterings," and the still more rapid flapping of a humming bird's wings produces a "humming" sound.

Further proof that the flap or flutter of a bird's wings is caused by the quick closing of the feather valves has been furnished by the valves in the wings of the experimental flying machine I have constructed, which lifts itself into the air and produces a sound similar to the flapping of a large bird's wings.

That the feathers of a bird's wing act as valves, opening and closing with each up and down stroke, can be proved by sight as well as by sound.

A quick eye can see the open bands in a pigeon's wings when the bird is rising from the ground a few feet distant. These bands can very plainly be seen when dark colored pigeons are rising or alighting to the eastward of the observer in the morning, when the wings are nearly vertical and the sunlight shows through the opened feather valves at each wing stroke. I have also observed dark bands in the wings of white pigeons flying against a dark cloudy sky.

The valve-like opening and closing of the feather blades in the wings of birds is also confirmed by the photographic views or moving pictures of a heron in flight taken by Prof. Marey of France in 1882, of which an account is given in *Chamber's Encyclopedia*, vol. 4, page 700.

Marey states that each feather has a proper and independent motion, and that while they are brought closely together during the downward motion of the wing, they are somewhat separated and placed on edge during the return movement, so as to offer to the air as little resistance as possible.

Anschutz of Germany in 1884, with dry plates, obtained photographs of a far more perfect character which fully corroborated the observations of Marey. (*Chamber's Encyclopedia*, vol. 4, p. 700).

Different species of birds have differently shaped wings, although the general plan of operation is much the same in all birds.

In each case the shape of the wings and powers of flight seem adapted to the mode of life followed by the bird. This adaptation has no doubt been caused by the action of the Darwinian law of natural selection and the survival of the fittest, through long periods of time.

Many small birds which feed upon the ground, as the sparrow, for example, are required to make a quick flight upward in order to escape from their four-footed enemies.

Such birds have the lifting power of the wings highly developed. Their wings when spread out in the position for flight, are broad, rounded, and deeply concave, and the outer or primary feathers are but slightly stronger or stiffer than the other wing feathers, and only a few of them extend straight out, or transverse, to the line of flight.

Such birds seem incapable of continuous level flight, but describe a series of curves or undulating motion, when flying across country, or from tree to tree.

After flapping their wings and rising obliquely for a short distance, they apparently find themselves going too high, and then close their wings and are carried forward and downward a short distance by momentum and gravity, when they again flap their wings and rise.

Water fowl, such as the wild duck, accustomed to live in flat marshy countries, are not required to fly high, but best escape from their enemies by making a rapid flight over the level waters.

Such birds have the propelling power of the wings highly developed, but they are unable to rise quickly. Their wings when spread out in position for flight, are long, narrow, and only slightly concave, and the primary feathers are very strong, broad, and stiff, and most of them extend out substantially transverse to the line of flight.

These marked differences between the outer or primary wing feathers of the birds which fly best over a level course and the birds which excel in upward flight, offers conclusive evidence that the propelling function of the wings is effected by means of the outer primary feathers.

The fact that the upper surface of each primary feather is smooth and even, the flattened quill-top being flush with the blade, while on the under side there are uneven ridges formed by the projection of the quill and its rib-like branches or barbs, strongly indicates the use of the smooth upper surface as a propelling plane during the upward stroke of the wing.

It is a remarkable fact that nearly all animals that fly through the air have a device very similar to my air-chamber.

All naturalists agree in stating that there are a series of air-sacs in the bodies of nearly all birds, which are directly connected by air-tubes with the lungs and throat of the bird, but they do not agree as to what is the useful purpose of these organs.

These air-chambers or air-sacs are in the upper part of the body of the bird when in the proper position for flight. That is, they are found in the upper and back part of the head, the upper part of the chest and abdominal cavities, and within the hollow upper bones of the leg (the thigh bones), and the large first bones of the wings.

The lungs of birds, which also contain air, are closely fixed to the back of the bird, in the highest possible position, while in other animals the lungs float free in the chest cavity.

Marey, in describing the form of the bird, says: "The lightest organs, the lungs and the air vessels, are in the upper part." (*Animal Mechanism*, page 216, International Scientific Series, Appleton & Co. New York, 1887.)

On the lowest part of the body of the bird (when in position for flight), we find the large keel bone or breast bone, and the large pectoral muscles which move the wings. This is the heaviest and densest part of the body, the pectoral muscles alone averaging one sixth of the entire weight of the bird.

The effect of the more dense lower part of the bird's body, in connection with the upper parts made specifically lighter by air-sacs, would be to automatically keep the heavier part downward during flight, through the action of the natural law known as the principle of Archimedes.

The fact that many species of flying insects, whose bodies are built on an entirely different plan from that of birds, also have air sacs in the upper parts of their bodies, (when in the position for flight) is more than a coincidence, and strongly indicates that the air-sacs have an important function in promoting flight.

I will mention only the locust, which has a number of air-sacs in the upper part of the head, two very large and two smaller ones in the upper part of the thorax, and five pairs in the upper part of the abdomen, just beneath the integument of the back. (See *Packard's Zoology*.)

The lifting power of these air-sacs cannot be of any great service to the bird or insect in getting up into the air, but I have no doubt that they are of great service in keeping its body in the required upright position for flight, a matter of the highest importance, since in any other position flight would be impossible.

What I claim is:

1. In a flying machine, an air-chamber in the superstructure thereof, made of a light framework covered by some fabric, convex on the upper and concave on the under side, circular in general plan, resembling an inverted saucer having a permanent shape and fixed position relative to adjoining parts, and forming on its under side in connection with the adjacent parts to which it is attached, a parachute having its concave under side open and unobstructed for the free entrance of air, and held in downward position by the heavier weight of the lower parts of the flying machine.

2. The combination of an air-chamber in the superstructure of a flying machine forming on its under side in connection with the adjacent parts to which it is attached, a parachute having a permanent shape and fixed position relative to adjoining parts, and having its concave under side open and unobstructed for the free entrance of air, and a tube extending through the body of the air-chamber which affords a limited outlet for the air under the parachute while descending, which is adapted in size to permit the escape of compressed air while falling in such quantity as to cause the maximum pressure under the parachute without an over accumulation of compressed air and consequent tipping or oscillation of the parachute, and which is used solely for this purpose.

3. In a flying machine, the combination of an air-chamber in the superstructure thereof made of a light framework covered by some fabric, convex on the upper and concave on the under side, circular in general plan, and resembling an inverted saucer, having a permanent shape and fixed position relative to adjoining parts, and forming on its under side, in connection with the adjacent parts to which it is attached, a parachute having its concave under side open and unobstructed for the free entrance of air, and held in downward position by the heavier weight of the lower parts of the flying machine, and aeroplanes extending laterally from the framework which supports the air-chamber.

4. In a wing of a flying machine, a plurality of valves located in the outer portion of the wing, each of which is capable of movement about an axis of support consisting of an elastic elongated member to which the valve is rigidly attached between the middle part of the valve and its sharp forward edge, the said member constituting the axis of support extending in a general arched position in a direction approximately transverse to the line of flight, and each valve adapted to close and sustain weight on the downward stroke of the wing, and to open and propel forward on the upward stroke.

5. In a flying machine, a platform or lower framework composed of two planes having the shape of two equal isosceles triangles united at their bases and forming an obtuse angle with each other on the upper side.

6. In a flying machine, an interlacing network of cords stretched over a platform or lower framework, and with a walk or flooring covering a portion of the network.

7. In a flying machine, the combination of a platform or lower framework composed of two planes having the shape of two equal isosceles triangles united at their bases and forming an obtuse angle with each other on the upper side, and supporting wheels at each side and at the front and rear ends of the platform, the end wheels being in a raised position such that only one of them can touch on level ground at the same time.

8. In a flying machine, the combination of a platform or lower framework composed of two planes having the shape of two equal isosceles triangles united at their bases and forming an obtuse angle with each other on the upper side, supporting wheels at each side and at the front and rear ends of the platform, and means for simultaneously controlling the two end wheels from a centrally located steering mechanism, consisting of ropes attached to opposite ends of cross-bars fixed to the upper end of the vertical axis upon which each of the wheels is supported.

9. In a flying machine, the combination of a platform or lower framework composed of two planes having the shape of two isosceles triangles united at their bases and forming an obtuse angle with each other on the upper side, supporting wheels at each side and at the front and rear ends of the platform, and means for controlling an end wheel for the purpose of steering during movement over land.

10. In the lower framework of a flying machine, the combination of a narrow walk or bridge secured to the central part of the framework, and extending to the front and rear ends of the framework, hand ropes stretched on each side at a convenient height above the walk or bridge, and an interlacing network of cords stretched from the hand ropes to the edges of the walk or bridge.

11. In a flying machine, a branching, framelike, wing-driving lever having a slotted inner end pivotally attached to an upright bar, a wide central part at the two opposite points of which it is mounted on a horizontal pivotal axis, and an outer end elastically connected to a wing shaft by means of a spring.

12. In a flying machine, a triangular frame which is mounted within the branching sides of a wing-driving lever, and which has an outwardly bending inner side pivotally supported at two points on the axial line of the said wing-driving lever, and which revolubly incloses a wing shaft at two points, first at the center of its outwardly bending inner side, and second at its outer corner or apex, where it is elastically connected to the said wing-driving lever by means of a spring.

13. In a wing of a flying machine adapted to oscillate up and down in a direction perpendicular to the line of flight, a plurality of overlapping valve-strips attached near their forward sides and throughout their entire length to narrow elastic bands and together with the elastic bands secured to arched cross-bars of a wing framework on the under side thereof at three or more points so as to extend in an arched position substantially at right angles to the normal line of flight, and adapted to be held by the torsional elasticity of the bands during the upward stroke of the wing in oblique position with reference to the direction of motion of the wing, with the sharp forward edge of each valve-strip cleaving the air obliquely upward and forward with slight air-resistance, and thus effecting propulsion.

14. In a flying machine, oscillating wings provided with valve-strips extending substantially at right angles to the normal line of flight which by means of elastic connection with the rigid framework of the wing near the forward side of each valve-strip are held during the upward stroke of the wing in oblique position with reference to the direction of motion of the wing, thus effecting propulsion.

15. In a flying machine, the framework of a wing consisting of a straight stem or shaft which has sufficient length to give every part of the wing blade an effective orbit of oscillation, and which extends lengthwise into the blade of the wing forming a central arched frame piece, arched cross-bars secured to the central arched frame piece on the under side thereof, and a rectangular rim joined to the central arched frame piece and the ends of the cross-bars.

16. In a flying machine, an elastic connection between a wing and a wing-driving lever having the same axis of oscillation as the wing, which connection renders the wing movement elastic, and thus prevents the shock that would result from an abrupt stopping of the wing at the end of each stroke.

17. In a flying machine, a wing shaft or stem revolubly mounted in a frame which has a pivotal axis coinciding with the axis of oscillation of the wing, a shank secured to the wing shaft or stem at right angles thereto at the point where it crosses the pivotal axis, ropes attached to the end of the shank, and passing through pulleys fixed directly in line with the axis of the frame, and thence running through other pulleys to a steering mechanism within reach of the operator, and the whole adapted to turn the blade of the wing either forward or backward.

18. In a flying machine, a centrally located framework supporting wings and extending from a lower platform to a superstructure, and making an angle with the superstructure at the front side greater than a right angle, and at the back side less than a right angle, and having that portion of the superstructure in front of the wings of less superficial area than the portion back of the wings.

19. In a flying machine, an elastic connection between a wing shaft whose movement is limited by a collar through which the shaft extends, and a wing-driving lever upon which the said collar is supported, which connection renders the wing movement elastic, and thus prevents the shock that would result from an abrupt stopping of the wing at the end of each stroke.

20. In a wing of a flying machine, the combination of a wing framework consisting of a straight stem or shaft which has sufficient length to give every part of the wing blade an effective orbit of oscillation and which extends lengthwise into the blade of the wing forming a central arched frame piece, arched cross-bars secured to the under side of the central arched frame piece, and a rectangular rim joined to the central arched frame piece and the ends of the cross-bars; an interlacing network of cords or wires secured on the under side of the framework to the cross-bars and rim; and a plurality of overlapping valve-strips attached at their forward sides throughout their entire length to narrow elastic bands, and together with the elastic bands secured to the arched cross-bars and to the rim of the wing framework on the under side thereof at three or more points and extending at right angles to the normal line of flight, and adapted to lie in closed position against the network of cords or wires during the downward stroke of the wing, thus effecting sustentation, and adapted to be held by the spring bands during the upward stroke in oblique position with reference to the direction of motion of the wing with the narrow forward edges of the valve-strips cleaving the air obliquely upward and forward, and thus effecting propulsion.

21. In a flying machine, the combination of two air-chambers in the superstructure thereof, each forming a parachute beneath, aeroplanes extending laterally from the framework which supports the air-chambers, and oscillating parachute-like wings, one extending outwardly from each side of the superstructure, substantially as described.

22. In the outer portion of a wing of a flying machine, a plurality of valves each of which, between its middle part and its sharp forward edge is rigidly attached to and supported upon an elongated elastic member extending approximately transverse to the line of flight, and each valve capable of movement about an axis extending lengthwise and centrally through the supporting member, such movement being caused during the upward stroke of the wing, by the greater air-pressure on the broad rear portion of the valve forcing that part downward, and causing the narrow portion of the valve in front of the axis of support to turn its sharp forward edge upward, while the resistant torsional elasticity of the supporting member holds the valve in a rearwardly slanting position so that the smooth upper surface of the valve will strike the air like an inclined plane, and propel the flying machine forward.

23. In a flying machine, means for turning, either backward or forward, non-oscillating wings or lateral aeroplanes which are revoluble about an axis transverse to the line of flight, consisting of ropes attached to the end of a shank extending at right angles from a stem or central shaft of each wing or aeroplane, and one of said ropes extending toward the front and another toward the rear, and each rope passing through fixed guide pulleys attached to the framework of the flying machine, and thence through other guide pulleys to a drum of a steering mechanism within reach of the operator.

24. In a wing of a flying machine, a plurality of elastic flattened members extending approximately transverse to the line of flight and supporting resilient valves, each valve being rigidly attached near its forward part to a supporting member, and each valve while subjected to air pressure during the upward stroke of the wing being held by the resistant tension of the elastic supporting member in such an oblique position downward and backward as to strike the air a glancing blow like the vane of a propeller, and thus propelling the flier forward.

25. In a wing of a flying machine, a plurality of elastic flattened members extending in a more or less arched position in a direction approximately transverse to the line of flight, and supporting resilient valves, each valve being rigidly attached between its middle part and sharp forward edge to a supporting member, and each valve being capable of movement about an axis extending lengthwise and centrally through the supporting member when forced downward by the greater air-pressure on the rear portion of the valve during the upward stroke of the wing.

26. In a wing of a flying machine, a plurality of elastic supporting members extending in a more or less arched position approximately transverse to the normal line of flight which by reason of their torsional elasticity are turned somewhat by rearwardly extending valves supported upon and rigidly attached to them, when the said valves are pressed downward by air resistance during the upward stroke of the wing, thus placing the sharp forward edges of the elastic supporting members in position to cleave the air obliquely upward and forward with slight air resistance.

27. In a flying machine, a wing framework composed of arched members extending lengthwise and crosswise and a plurality of valve-strips each extending approximately transverse to the normal line of flight and each valve-strip secured to the under side of the arched wing framework by means of an elastic flattened member to which the valve-strip is rigidly fastened.

28. In a wing of a flying machine, a plurality of elastic supporting members extending in a more or less arched position approximately transverse to the line of flight which by reason of their torsional elasticity are turned somewhat by valves supported upon and rigidly attached to them, when the rear portions of the said valves are pressed downward by air resistance during the upward stroke of the wing, thus placing the sharp forward edges of the valves in position to cleave the air obliquely upward and forward with slight air resistance.

29. In a wing of a flying machine, a plurality of narrow resilient aeroplanes extending in a more or less arched position approximately transverse to the line of flight, each having a thickened elastic supporting part extending lengthwise of the aeroplane between its middle and its sharp forward edge, and each aeroplane capable of movement about an axis extending lengthwise through the supporting part, such movement being caused by air resistance during the upward stroke of the wing pressing the broader rear portion of the aeroplane obliquely downward and backward, and thus causing that portion of the aeroplane in front of the supporting axis to turn its sharp forward edge obliquely upward and forward.

30. In a flying machine, the combination of a framework of a wing blade consisting of arched frame pieces extending lengthwise and crosswise of the wing blade and secured to each other at right angles, and each frame piece joined at two points to a continuous rectangular rim, every part of which is in the same plane; an interlacing network of cords or wires secured on the under side of the wing framework; and a plurality of overlapping valve-strips attached near their forward sides to narrow elastic bands, and together with the elastic bands secured to arched cross-bars and to the rim of the wing framework on the under side thereof at three or more points, and extending in a direction substantially at right angles to the normal line of flight.

31. In a flying machine, the combination of a wing framework, concave on the under side, a network of cords or wires secured to the under side of the framework, a plurality of elastic valve-supporting members secured to cross-bars and the rim of the wing framework on the under side thereof and next below the said network and extending in a more or less arched position in a direction substantially transverse to the normal line of flight, and resilient valves each of which is rigidly secured near its forward part to one of the said members.

32. In a flying machine, the combination of a wing framework concave on the under side, a plurality of elastic valve-supporting members which are secured to the under side of cross-bars and to the rim of the wing framework and extend in a more or less arched position in a direction substantially transverse to the normal line of flight, and resilient valves each of which is rigidly secured near its forward part to one of the said members.

33. In a wing of a flying machine, the combination of a plurality of elastic valve-supporting members which extend in a more or less arched position in a direction approximately transverse to the normal line of flight, and resilient valves each of which is rigidly secured near its forward part to one of the said members.

34. In a flying machine, means for turning either backward or forward, wings or lateral aeroplanes which are revoluble about an axis transverse to the line of flight, consisting of a steering mechanism located within reach of the operator, and constructed of two drums placed end to end and revoluble on a common axle shaft extending transversely of the flying machine and similarly situated with reference to each of the wings or lateral aeroplanes, and each drum having radial arms or spokes extending outwardly from the ends which are adjacent, and each drum being connected with an adjacent wing or lateral aeroplane by means of ropes attached to the end of a shank extending at right angles from the stem or axial shaft of each wing or lateral aeroplane, and one of said ropes extending toward the front and the other toward the rear, and each rope passing through fixed guide pulleys attached to the framework of the flying machine, and thence running through other guide pulleys to and around the said drum and secured at one point to the drum.

WILLIAM S. CRANMER.

Witnesses:
U. GRANT HAYDEN,
B. W. DOYLE.